United States Patent [19]
Shepherd

[11] Patent Number: 5,793,424
[45] Date of Patent: Aug. 11, 1998

[54] SYNCHRONOUSLY GATED HIGH SPEED CCD IMAGER SYSTEM

[75] Inventor: Orr Shepherd, Arlington, Mass.

[73] Assignee: Visidyne, Inc., Burlington, Mass.

[21] Appl. No.: 635,720

[22] Filed: Apr. 22, 1996

[51] Int. Cl.$^6$ ............................................. H04N 5/335
[52] U.S. Cl. ........................... 348/314; 348/241; 257/223
[58] Field of Search ................................... 348/314, 299, 348/362, 241; 257/223, 230

[56] References Cited

U.S. PATENT DOCUMENTS

| | | | |
|---|---|---|---|
| 4,577,115 | 3/1986 | Rentsch et al. | 250/208.3 |
| 4,809,073 | 2/1989 | Chiba et al. | 348/314 |

Primary Examiner—Andrew I. Faile
Assistant Examiner—Andrew B. Christensen
Attorney, Agent, or Firm—Iandiorio & Teska

[57] ABSTRACT

A synchronously gated high speed CCD imager system having a predetermined frame time includes: a CCD interline transfer array including a plurality of photoelectric collection quantum wells for collecting photoelectrons from an object; a plurality of storage wells associated with the collection wells; an anti-blooming circuit for diverting photoelectrons from accumulating in the collection wells; and switching means for transferring the photoelectrons accumulated in the collection wells to the storage wells and enabling the anti-blooming circuit during synchronized portions of the frame time to divert photoelectrons from accumulating in the collection wells and for disabling the anti-blooming circuit to enable the collection wells to collect photoelectrons during another portion of the frame time.

4 Claims, 6 Drawing Sheets

SYNCHRONOUSLY GATED HIGH SPEED CCD IMAGER SYSTEM

FIELD OF INVENTION

This invention relates to a high speed electro-optic gated imager system and more particularly to such an imager system that is useful for three-dimensional imaging and other applications by independently controlling, from an external source of timing, the timing and duration of photoelectron collection time during each image frame time.

BACKGROUND OF INVENTION

CCD imagers integrate photoelectrons in an array of quantum storage wells over each image frame time, typically 1/30 second, and at the end of each image frame time the accumulated photoelectrons are transferred down the array by vertical shift registers, one for each column of quantum storage wells, to a horizontal shift register. The horizontal shift register outputs serial image data for off chip digitization, processing, application and/or display.

In many imaging applications, such as in commercial video, it is desirable to provide exposure control by controlling the length of time photoelectron collection occurs for multiple samples during each image frame time. Mechanical and electro-optical high speed optical gating or shutter devices can be utilized for this purpose, however, they have a number of shortcomings when applied to synchronous gating.

Mechanical shutters, such as leaf spring and focal plane shutters as well as chopper wheel shutters which operate by using a blade that is driven in front of a camera by a motor are too slow for most video applications as they typically operate at a frequency of no greater than approximately 1 KHz. Moreover, these shutters are mechanical devices which can be unreliable, noisy and inefficient. To effectively use optical gating for three-dimensional imaging, for example, gating on durations of approximately 10 nsec and frequencies of up to 30 MHz or higher are desired.

Offchip electro-optical shutters, such as gated microchannel plate intensifier tubes (MCPTS), gated first generation image intensifiers, and Pockel's cell optical shutters operate at a sufficiently high frequency for use in synchronously gated video applications, however, they are very expensive and require a significant amount of power to operate at high frequencies. Also, the addition of a separate imager gate greatly complicates the sensor optical configuration can degrade image quality, and limit dynamic range.

SUMMARY OF INVENTION

It is therefore an object of this invention to provide a synchronously gated high speed CCD imager system which operates at very high shutter speeds sufficient for synchronously gated video and other imaging applications.

It is a further object of this invention to provide such a synchronously gated high speed CCD imager system which has very low power requirements.

It is a further object of this invention to provide such a synchronously gated high speed imager which is compact and efficient.

It is a further object of this invention to provide such a synchronously gated high speed imager system which is significantly less expensive than conventional electro-optical high speed shutters.

This invention results from the realization that a truly high speed and reliable electronic imager can be achieved with a synchronously gated high speed CCD imager by providing a CCD interline transfer array architecture with anti-blooming gates for controlling the transfer of photoelectron charge accumulated in the collection wells of the CCD array to the storage wells of the CCD array by enabling the anti-blooming gates during one portion of the frame time to divert photoelectrons from accumulating in the collection wells and for disabling the anti-blooming gates to enable the collection wells to collect photoelectrons during another portion of the frame time.

This invention features a synchronously gated high speed CCD imager system having a predetermined frame time. The system includes a CCD interline transfer type array including a plurality of photoelectric collection quantum wells for collecting photoelectrons from an object. There are a plurality of storage wells associated with the collection wells and an anti-blooming circuit for diverting photoelectrons from accumulating in the collection wells. There are switching means for synchronizing transferring of the photoelectrons accumulated in the collection wells to the storage wells and enabling the anti-blooming circuit during one portion of the frame time to divert photoelectrons from accumulating in the collections wells and for disabling the anti-blooming circuit to enable the collection wells to collect photoelectrons during another portion of the frame time.

In a preferred embodiment the anti-blooming circuit may include an anti-blooming gate interconnected with each collection well. The switching means may include a plurality of uni-directional switching circuits for transferring the photoelectrons accumulated in the collection wells to the storage wells at the onset of the one portion of the frame time. The switching means may include a plurality of bi-directional switching circuits for transferring the photoelectrons accumulated in the collection wells to the storage wells at the onset of the one portion of the frame time and for transferring the stored photoelectrons back into the collection wells for further accumulation of photoelectrons in the collection wells at the onset of another portion of the frame time.

This invention also features a synchronously gated high speed CCD imager system. The system includes a plurality of synchronously gated CCD imager arrays.

Each array includes a plurality of photoelectric collection quantum wells for collecting photoelectrons from an object and a plurality of storage wells associated with the collection wells. The arrays each include an anti-blooming circuit for diverting photoelectrons from accumulating in the collection wells. The system also includes switching means for successively disabling the anti-blooming circuit of each synchronously gated CCD imager array for a predetermined time period to enable its collection wells to collect photoelectrons while simultaneously enabling the anti-blooming circuit of the other synchronously gated CCD imager arrays during the time period to divert photoelectrons from accumulating in their collection wells and for transferring the collected photoelectrons from the collection wells to the storage wells of the synchronously gated CCD imager array whose anti-blooming circuit was last disabled.

In a preferred embodiment each anti-blooming circuit may include an anti-blooming gate interconnected with each quantum well. The switching means may include a plurality of uni-directional switching circuits for transferring, at the onset of the predetermined time period, charge accumulated in the storage wells to the collection wells of the synchronously gated CCD imager array whose anti-blooming circuit was last disabled. The switching means may include a plurality of bi-directional switching circuits for transferring, at the onset of the predetermined time period, the charge accumulated in the collection wells to the storage wells of the synchronously gated CCD imager array whose anti-blooming circuit was last disabled and for simultaneously transferring the accumulated photoelectrons back into the collection wells of the synchronously gated CCD imager array whose anti-blooming circuit is presently disabled for further accumulation of photoelectrons in the collection wells during the predetermined time period.

DISCLOSURE OF PREFERRED EMBODIMENT

Other objects, features and advantages will occur to those skilled in the art from the following description of a preferred embodiment and the accompanying drawings, in which.

Figure 1:
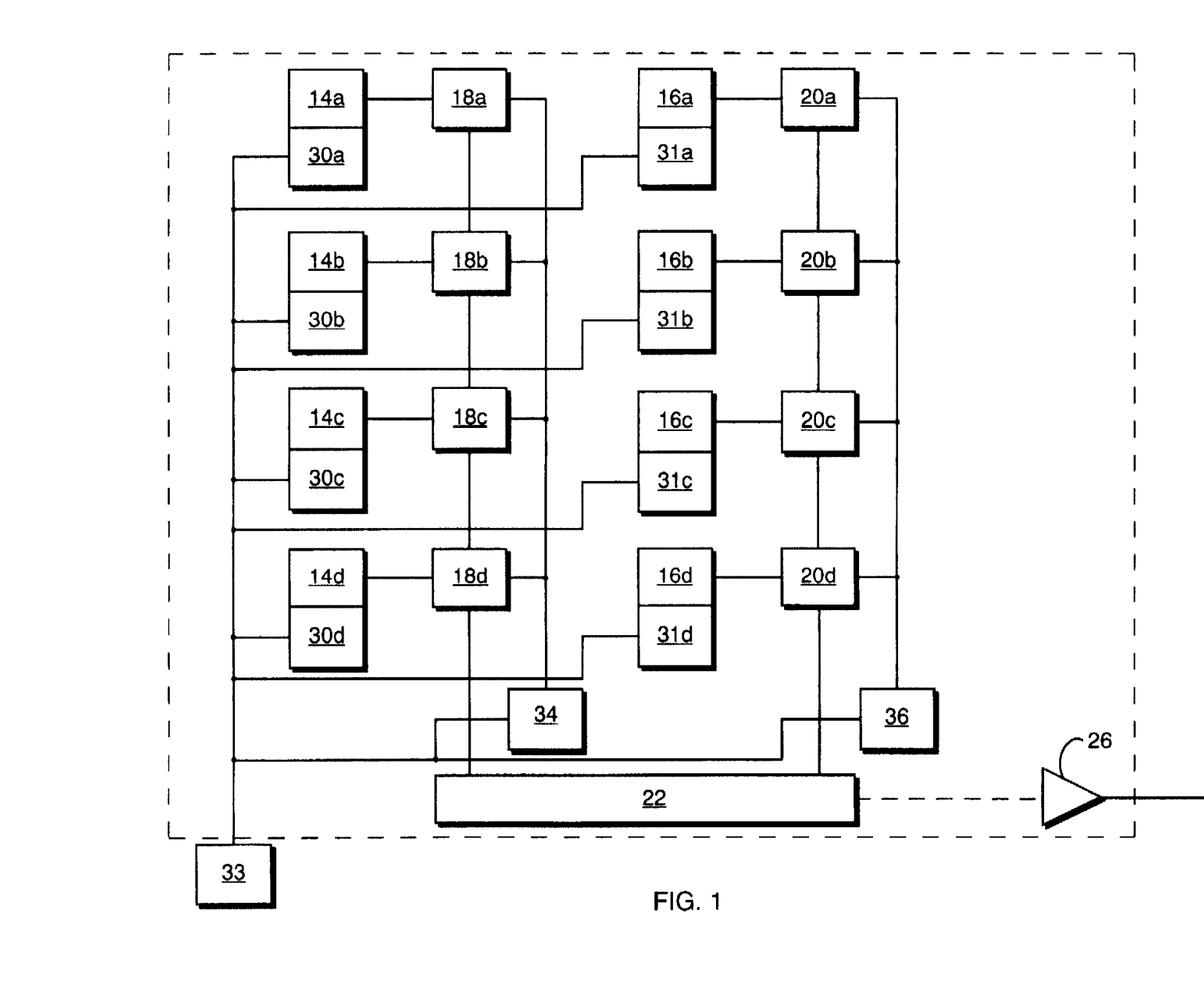
FIG. 1 is a schematic block diagram of a synchronously gated high speed CCD imager according to this invention.

Synchronously gated high speed CCD imager 10, FIG. 1, includes a new type of interline transfer CCD imager 12, including a plurality of columns of photosensitive quantum wells only two of which, 14 and 16, are shown. Each column includes a plurality of quantum wells 14a–d and 16a–d, each representing one pixel of CCD imager 12. Although for clarity sake an array of only two columns with four pixels in each column is shown, a typical CCD imager could include an array of 512 columns with 512 pixels in each column. Photons incident upon CCD imager 12 in the form of a focused image, generate photoelectrons which are collected or integrated in the quantum wells 14a–d and 16a–d. At the end of an integration period or frame time, typically 1/30 second, the electrons accumulated in quantum wells 14a–d and 16a–d are transferred simultaneously to their associated, adjacent quantum storage wells/vertical shift registers 18a–d and 20a–d. In conventional interline transfer CCD imagers, upon completion of the electron transfer from quantum wells 14a–d and 16a–d to storage wells/vertical shift registers 18a–d and 20a–d, collection of photoelectrons in the now empty photosensitive quantum wells 14a–d and 16a–d begins again to start the next frame time. Simultaneously, photoelectrons in the storage wells 18a–d and 20a–d are clocked out of the storage wells through the vertical shift registers. The vertical shift register outputs are clocked into horizontal shift register 22 which outputs serial image data through amplifier 26 to serial video data line 28 for subsequent processing and/or display.

In certain applications, one of which is described below with regard to FIGS. 4 and 5, it is desirable to "shutter" or gate the photoelectron integration by CCD imager 12 and, as synchronized by an external clock, quantum wells 14a–d and 16a–d many times during each frame time. That is, it is desirable to turn CCD imager 12 on (to collect photoelectrons) and off (to prevent collection of photoelectrons) many times during each frame time. As discussed in the Background of Invention this may be accomplished by mechanical means, however, this type of shuttering is rather slow and can operate at a frequency of no greater than 1 KHz which is insufficient for most applications. The electro-optical shutters discussed in the Background of Invention operate at sufficiently high frequencies, but their cost and power requirements are prohibitive in many applications.

According to this invention, to accomplish sufficiently fast shuttering or gating at a low cost and with low power requirements, anti-blooming gates 30a–d and 31a–d, are incorporated in the imager. Anti-blooming gates 30a–d interconnected with quantum wells 14a–d, respectively, and anti-blooming gates 31a–d are interconnected with quantum wells 16a–d, respectively. The remaining quantum wells of CCD imager 12 which are not shown each also include an anti-blooming gate. When the anti-blooming gates are biased positively for a predetermined time period by a control signal on line 32 from gating circuit 33, which may be any suitable type of timing circuit for a given application, the photoelectrons generated in quantum wells 14a–d and 16a–d are removed or drained away. This prevents the photoelectrons from being transferred into their associated storage wells 18a–d and 20a–d. Thus, when the anti-blooming gates 30a–d and 31a–d are positively biased, CCD imager 12 is gated off and shutter system 10 effectively closes the "shutter" to CCD imager 12. And, when the control signal on line 32 from gating circuit 33 causes the anti-blooming gates 30a–d and 31a–d to be reversed biased, photoelectron integration is initiated and shutter system 10 effectively opens the "shutter" to CCD imager 12. With system 10 the electronic shuttering or gating can operate at rates of typically 3 MHz. Accordingly, synchronously gated high speed CCD imager system 10 enables CCD imager 12 to be gated on and off to obtain as typically 100,000 samples during each 1/30 second image frame time.

When anti-blooming gates 30a–d and 31a–d are reversed biased, quantum wells 14a–d and 16a–d collect photoelectrons. After collection, the photoelectrons are transferred to storage wells 18a–d and 20a–d where they are added to previously accumulated and stored photoelectrons which were accumulated during previous integration periods within the present frame time. When one image frame time is complete all of the photoelectrons in the storage wells 18a–d and 20a–d are transferred out to horizontal shift register 22 and then are clocked out through amplifier 26 to serial video data line 28.

Photoelectron transfer circuits 34 and 36 which use various conventional CCD electron transfer technologies are interconnected with storage wells 18a–d and 20a–d and receive control signals from gating circuit 33 that are also provided to anti-blooming gates 30a–d and 31a–d. Photoelectron transfer circuits 34 and 36 enable the transfer of photoelectrons from quantum wells 14a–d and 16a–d to storage wells 18a–d and 20a–d, respectively, synchronously with the enabling of anti-blooming gates 30a–d and 31a–d. This transfer occurs at the CCD pixel rate (typically 10–20 MHz). The anti-blooming gates are enabled immediately before the transfer. Thus, after photosensitive quantum wells 14a–d and 16a–d have accumulated photoelectrons over an integration period, the stored photoelectrons are transferred to storage wells 18a–d and 20a–d synchronously with the enabling of anti-blooming gates 30a–d and 31a–d.

In the alternative, photoelectron transfer circuits 34 and 36 may be configured so that photoelectrons are bi-directionally transferred between photosensitive quantum wells 14a–d and 16a–d and storage wells 18a–d and 20a–d, respectively. These transfers are also synchronized with the control signal supplied over line 32 from gating circuit 33. That is, while anti-blooming gates 30a–d and 31a–d are positively biased and the photoelectrons are being drained from quantum wells 14a–d and 16a–d, the photoelectrons within storage wells 18a–d and 20a–d are maintained therein. However, when the anti-blooming gates 30a–d and 31a–d are reversed biased, as a result of the control signal on line 32, and CCD imager 12 is integrating photoelectrons, photoelectron transfer circuits 34 and 36 enable the transfer of the photoelectrons stored in the storage wells 18a–d and 20a–d back into quantum wells 14a–d and 16a–d, respectively, for further accumulation of photoelectrons. As described above, at the end of one frame time the total integrated photoelectron charge within storage wells 18a–d and 20a–d is shifted out to horizontal shift registers 22 and 24 and serially read out over serial video data line 28.

Figure 2:
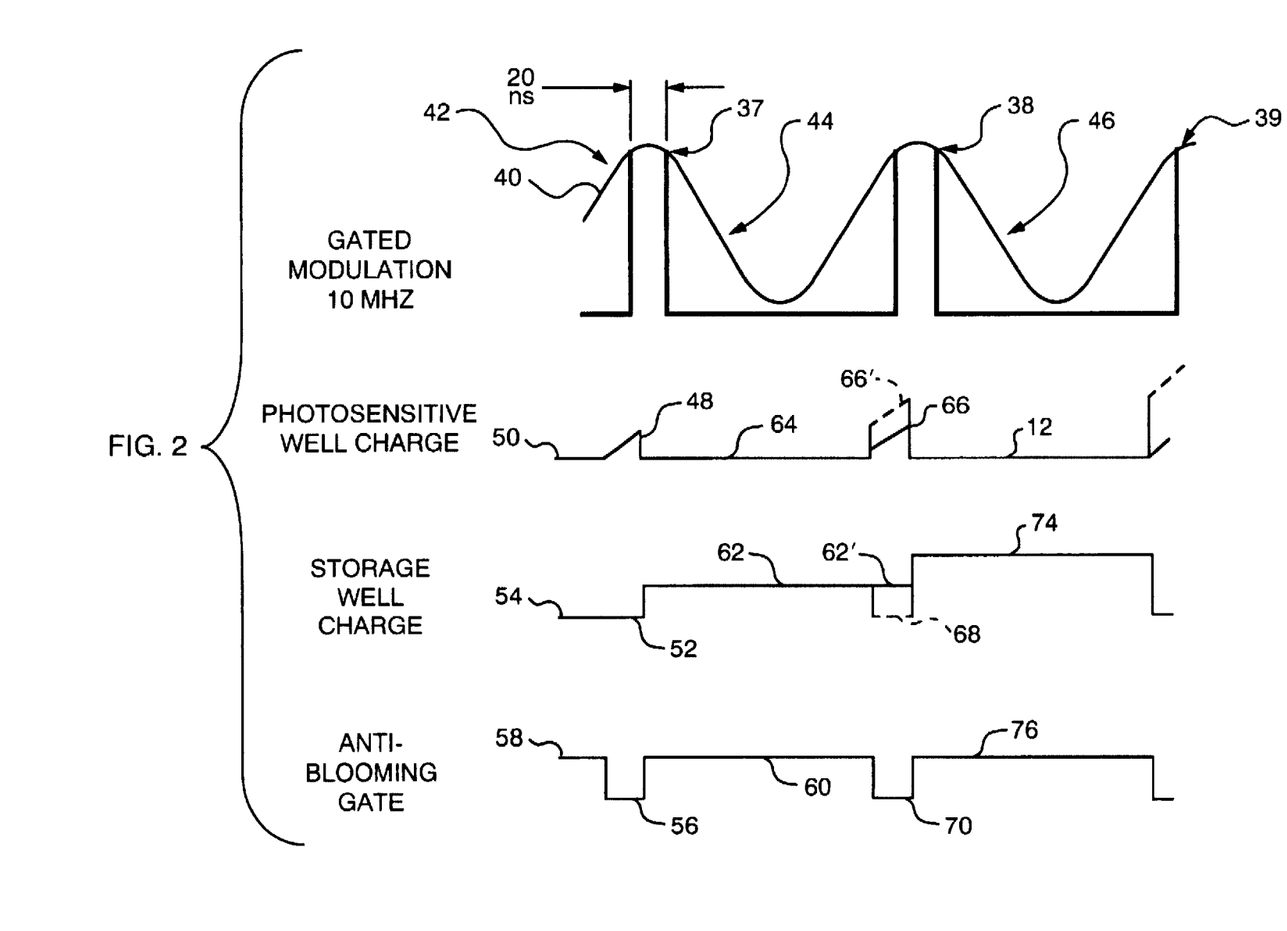
FIG. 2 is a timing diagram depicting the operation of the synchronously gated high speed CCD imager of FIG. 1.

A timing diagram depicting the operation of shutter system 10 is shown in FIG. 2. Photosensitive quantum wells 14a–d and 16a–d, FIG. 1, may be gated such that they are on and accumulating photoelectrons during integration periods 37 and 38 (approximately 20 nanoseconds) of 10 MHz sine wave 40. Thus, during the other portions 42, 44 and 46 of sine wave 40, photosensitive quantum wells 14a–d and 16a–d are not accumulating photoelectrons as anti-blooming gates 30a–d and 31a–d are draining the electrons from the wells. As described above with regard to FIG. 1, the control signal over line 32 from gating circuit 33 is supplied to the anti-blooming gates 30a–d and 31a–d to enable the anti-blooming gates to drain the photoelectrons from the photosensitive quantum wells 14a–d and 16a–d during portions 42, 44 and 46 of sine wave 40 and to disable the anti-blooming gates during integration periods 37 and 38 of sine wave 40 to allow photosensitive quantum wells 14a–d and 16a–d to accumulate photoelectrons therein. The timing scheme of FIG. 2 is merely exemplary and any appropriate timing scheme could be used to gate the photosensitive quantum wells 14a–d and 16a–d of system 10.

During the first integration period 37, anti-blooming gates 30a–d and 31a–d are disabled and photoelectrons are collected and integrated in photosensitive quantum wells 14a–d and 16a–d as indicated by ramp 48 of photosensitive quantum well charge waveform 50. During this integration period the respective storage wells 18a–d and 20a–d are not accumulating photoelectrons as indicated by low level 52 of storage well charge waveform 54. Photosensitive quantum wells 14a–d and 16a–d are able to accumulate and integrate photoelectrons because anti-blooming gates 30a–d and 31a–d are disabled during integration period 37 as indicated by low level 56 of anti-blooming gate waveform 58. After integration period 37, during period 44 of sine wave 40, anti-blooming gates 30a–d and 31a–d are enabled as indicated by high level 60 of anti-blooming gate waveform 58. During this period the charge from photosensitive quantum wells 14a–d and 16a–d is transferred to storage wells 18a–d and 20a–d, respectively, and stored therein as indicated by level 62 of storage well charge waveform 54. Low level 64 of photosensitive quantum well charge waveform 50 indicates that no photoelectrons are being collected in photosensitive quantum wells 14a–d and 16a–d during portion 44 of sine wave 40 and that the photoelectrons have been transferred to storage wells 18a–d and 20a–d.

At the beginning of integration period 38 the photoelectrons remain within storage wells 18a–d and 20a–d as indicated by level 62'. Accordingly, photosensitive quantum well charge waveform 50 ramps up to level 66 during integration period 38. After integration period 38, the photoelectrons collected as indicated by ramp 66 are then transferred to storage wells 18a–d and 20a–d and added to the photoelectrons which were already stored within storage wells 18a–d and 20a–d as indicated at level 74.

In an alternative embodiment photoelectron transfer circuits, 34 and 36, FIG. 1, are configured to achieve bi-directional transfer between the quantum and storage wells. At the beginning of integration period 38, photoelectrons stored within storage wells 18 a–d and 20a–d indicated at 62 are transferred back into photosensitive quantum wells 14 a–d and 16a–d and more photoelectrons are collected and integrated over integration period 38 as indicated by level 66' shown in phantom. Low level (shown in phantom 68) of storage well charge waveform 54 shows that there are no photoelectrons within storage wells 18a–d and 20a–d during integration period 38. The photoelectrons are transferred back into photosensitive quantum wells 14a–d and 16a–d from storage wells 18a–d and 20a–d by photoelectron transfer circuits 37 and 38, which are enabled by the control signal provided over line 32 from gating circuit 33. The further accumulation and integration of charge within quantum wells 14a–d to 16a–d is enabled by the disabling of anti-blooming gates 30a–d and 31a–d as indicated by level 70 during integration period 38.

After integration period 38, accumulation and integration of photoelectrons within quantum wells 14a–d and 16a–d is ceased as indicated by low level 72 of photosensitive quantum well charge waveform 50. Transfer of the photoelectrons accumulated during integration periods 37 and 38 from quantum wells 14a–d and 16a–d to storage wells 18a–d and 20a–d is indicated by level 74 of storage well charge waveform 54. The termination of accumulation of photoelectrons in photosensitive quantum wells 14a–d and 16a–d and the transfer of photoelectrons from the quantum wells to the associated storage wells occurs synchronously with the enabling of anti-blooming gates 30a–d and 31a–d as indicated by high level 76 of anti-blooming gate waveform 58.

The collection of photoelectrons in the quantum wells, transfer of photoelectrons between the quantum wells and the storage wells and the operation of the anti-blooming gates are physically depicted in FIGS. 3A–E.

Figure 3A:
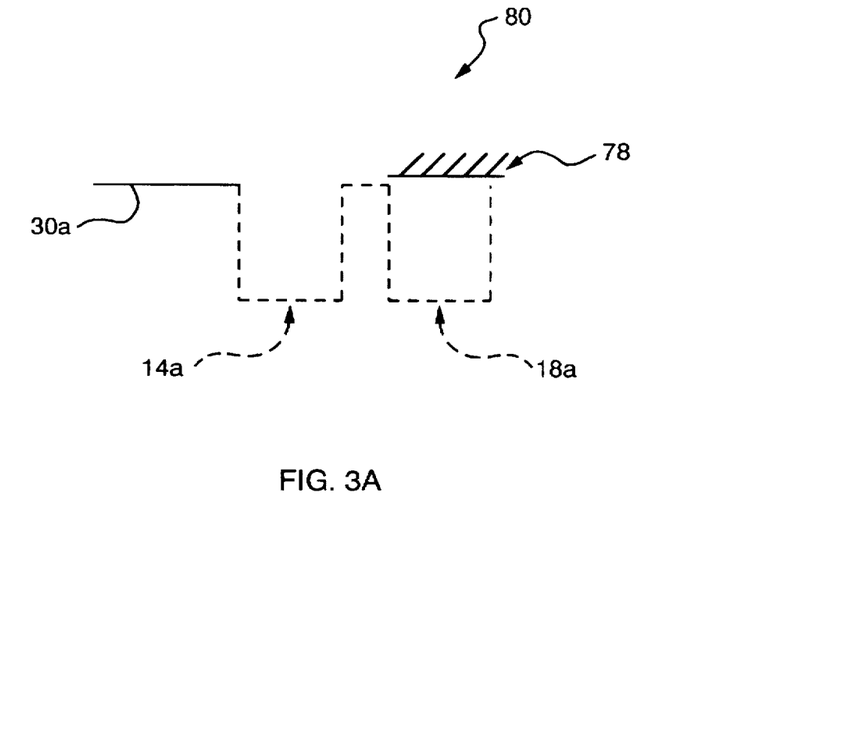
FIG. 3A is a cross-sectional view of one pixel of the system of FIG. 1.

Pixel 80, FIG. 3A, includes photosensitive quantum well 14a and its associated storage well 18a. Storage well 18 includes mask 78 which prevents the accumulation of photoelectrons in storage well 18a other than photoelectrons transferred from quantum well 14a. Also included is anti-blooming gate 30a which is connected to photosensitive quantum well 14a. The configuration shown in FIG. 3A is present at each pixel of the CCD imager 12 of system 10, FIG. 1.

Figure 3B:
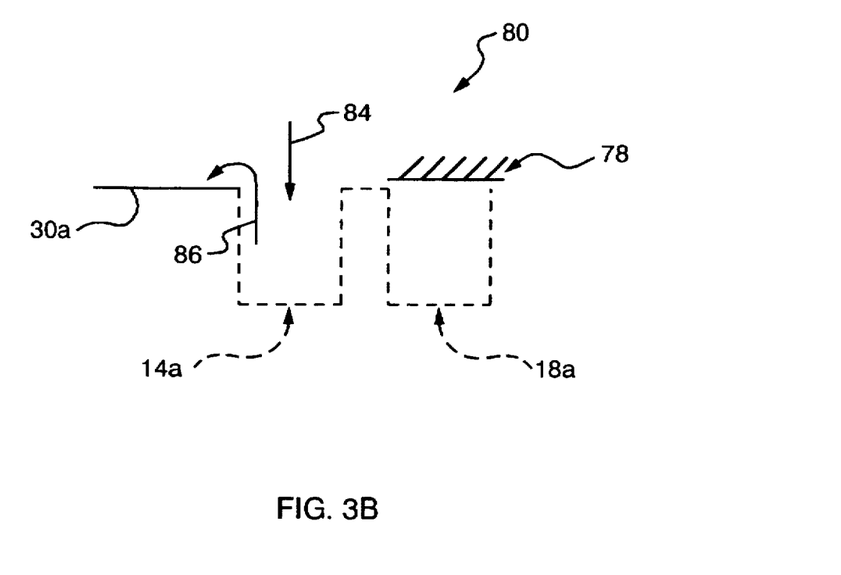
FIG. 3B depicts the pixel of FIG. 3A with the anti-blooming gate removing charge from the quantum well.

The operation of pixel 80 when the anti-blooming gate 30a is enabled and preventing accumulation and integration of photoelectrons within photosensitive quantum well 14a is shown in FIG. 3B where photoelectrons indicated at arrow 84 enter photosensitive quantum well 14a. However, because anti-blooming gate 30 is enabled it causes the photoelectrons to be drained from photosensitive quantum well 14a as indicated by arrow 86. Referring to the timing diagram of FIG. 2, pixel 80 and the remainder of the pixels of system 10 are gated off, for example at portion 42 of sine wave 40. During this portion of sine wave 40 no charge is being collected within quantum well 14a, no photoelectrons are stored within storage well 18a, and anti-blooming gate 30a is enabled, thereby draining photoelectrons from photosensitive quantum well 14a.

Figure 3C:
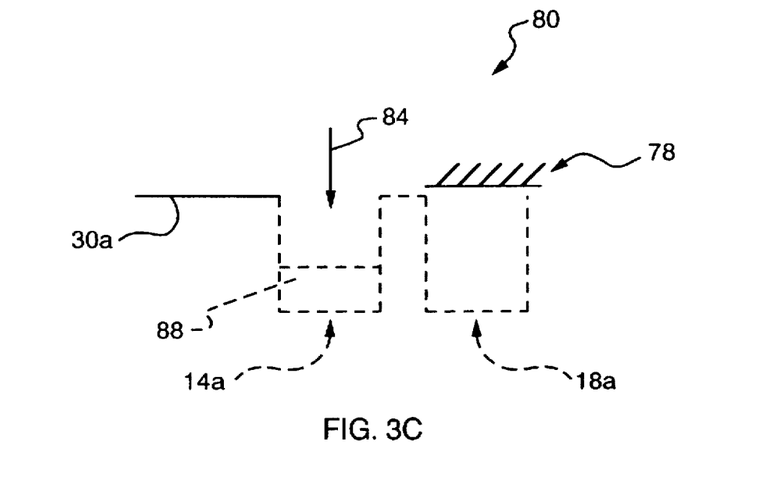
FIG. 3C depicts the pixel of FIG. 3A collecting photoelectrons in the quantum well.

In FIG. 3C the collection of photoelectrons during an integration period, such as integration period 37, FIG. 2, is shown. Here, photoelectrons 88 are collected and integrated within photosensitive quantum well 14a because anti-blooming gate 30a is disabled and is not draining photoelectrons from quantum well 14a. Referring to FIG. 2, it can be seen that during integration period 37 photoelectrons are being integrated and accumulated within photosensitive quantum well 14a and no photoelectrons are stored within storage well 18a.

Figure 3D:
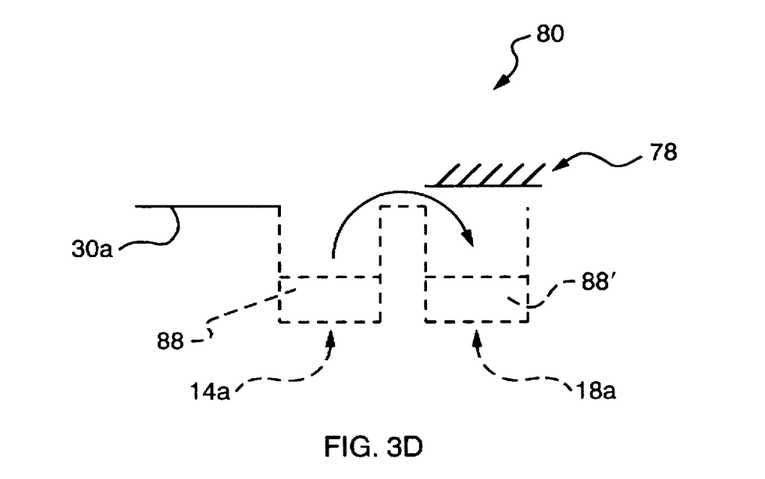
FIG. 3D depicts the pixel of FIG. 3A transferring photoelectrons from the quantum well to the storage well.

In FIG. 3D, photoelectrons 88 are transferred from photosensitive quantum well 14a to storage well 18 as indicated by stored photoelectrons 88'. Referring again to FIG. 2, this transfer occurs at the end of integration period 37 where it is shown that the photosensitive quantum well charge waveform 50 drops to a low level 64 and storage well charge waveform 54 rises to level 62. Simultaneously with this transfer, anti-blooming gate 30a is enabled so that photoelectrons are not collected in photosensitive quantum well 14a during period 44 of waveform 40.

Figure 3E:
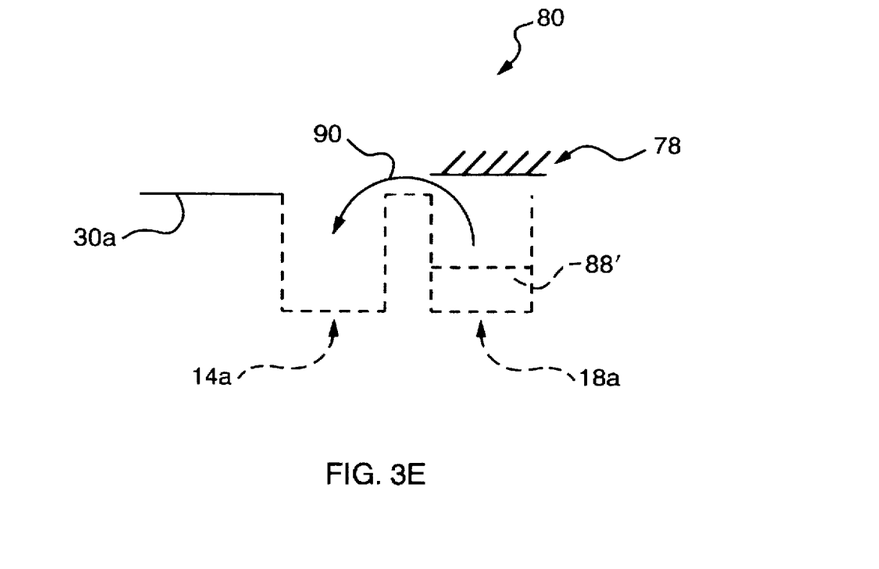
FIG. 3E depicts the pixel of FIG. 3A transferring photoelectrons from the storage well back into the quantum well.

If system 10, FIG. 1, is configured such that photoelectron transfer circuits 34 and 36 are bi-directional, stored photoelectrons 88', FIG. 3E, are transferred back into the photosensitive quantum well 14a for further collection of photoelectrons during the next integration period as indicated by arrow 90. This occurs at the beginning of integration period 38, FIG. 2. Here it can be seen that the photoelectrons stored within storage well 18a are transferred back into photosensitive quantum well and further photoelectrons are accumulated and integrated as indicated at ramp 66' of photosensitive quantum well charge waveform 50.

Using a number of imager systems according to this invention and gating them on and off individually with gating signals from separate gating circuits may be useful in certain video and imaging applications. Imaging system 100, FIG. 4, is comprised of three synchronously gated high speed CCD imager devices 10a, 10b and 10c which are configured identically to system 10, FIG. 1. Imager devices 10a, 10b and 10c are gated on and off in synchronism but with a time delay between each by signal 102 and by gating circuit 33'. Gating circuit 33' provides over line 103a–c signals to imager devices 10a, 10b and 10c which in synchronism with signal 102 enable imager devices 10a, 10b, or 10c to accumulate/integrate photoelectrons for a predetermined time periods or disable the imager devices to prevent the accumulation/integration of photoelectrons during the predetermined time periods.

Figure 4:
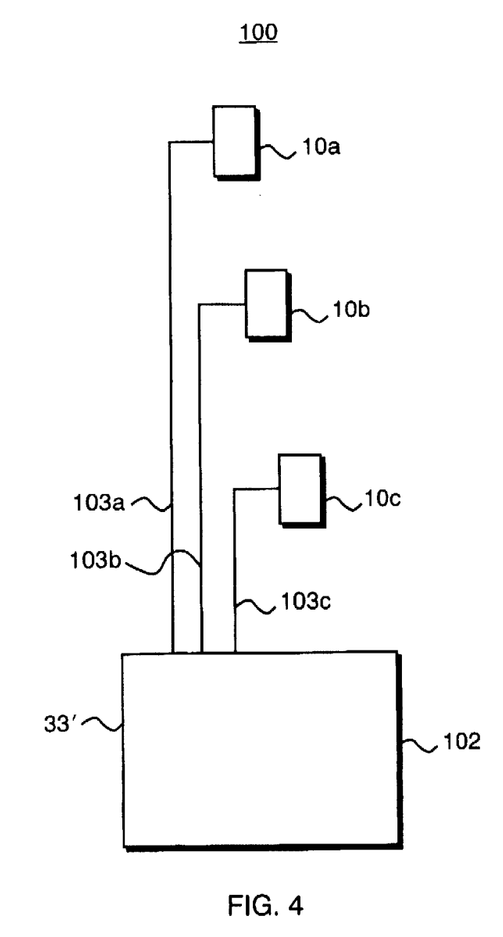
FIG. 4 is a schematic block diagram of a portion of one application, e.g. a three-dimensional imaging system, which utilizes three synchronously gated high speed CCD imagers.
Figure 5:
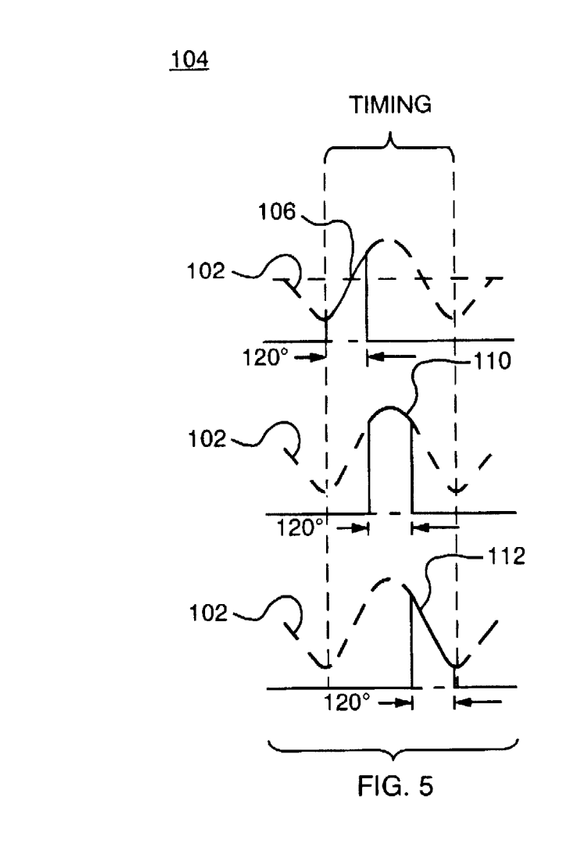
FIG. 5 is a timing diagram depicting the gating scheme of the three-dimensional imaging system of FIG. 4.

Timing diagram 104, FIG. 5, illustrates how gating circuit 33', FIG. 4, enables and disables each imager device 10a, 10b and 10c. Signal 102 which operates gating circuit 33' may be, for example, a 1 MHz sine wave. During the first 120° portion 106 of one full cycle 108 of sine wave 102, gating circuit 33' enable imager device 10a to accumulate and integrate photoelectrons while imager devices 10b and 10c are disabled by gating circuit 33'. During the second integration period 110, imager devices 10a and 10c are disabled while imager device 10b is enabled and accumulating/integrating photoelectrons. During integration period 112, imager device 10c is accumulating/integrating photoelectrons while imager devices 10a and 10b are disabled and not accumulating/integrating photoelectrons. The above described gating scheme is only exemplary and various suitable gating schemes, which will be apparent to those skilled in the art, can be utilized to gate on and off a number of imager devices according to this invention.

Figure 6:
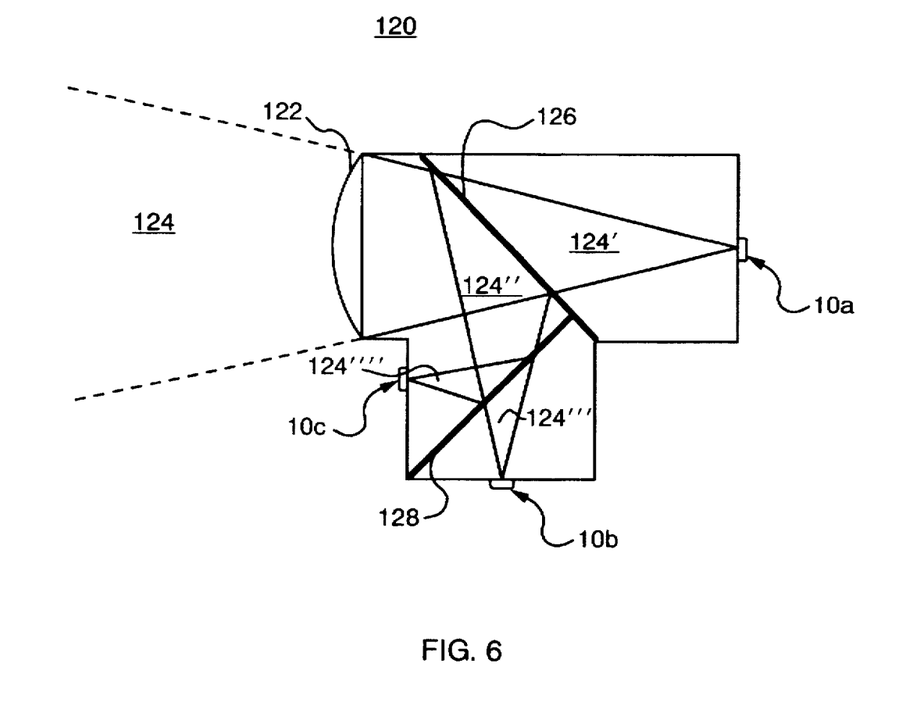
FIG. 6 is a cross-sectional view of one optical configuration of the imaging system of FIG. 4.

Optical head 120, FIG. 6, depicts one configuration in which the imager system 100 of FIG. 4 may be arranged. Optical head 120 includes a single objective lens 122 which receives incoming illumination 124. One third of illumination 124 passes through partially transmissive mirror 126 as indicated by 124' and is focused on imager system 10a, while the remaining two thirds of the illumination 124 is reflected off the surface of mirror 126 and is directed to partially transmissive mirror 128 as indicated at 124". Mirror 128 passes one half of the remaining illumination (124'") to imager system 10b and the other half of the remaining illumination (124"") is reflected onto the surface of imager system 10c.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A synchronously gated high speed CCD imager system having a predetermined frame time comprising:
    a CCD interline transfer array including a plurality of photoelectric collection quantum wells for collecting photoelectrons from an object;
    a plurality of storage wells associated with said collection wells;
    an anti-blooming circuit for diverting photoelectrons from accumulating in said collection wells; and
    switching means including a plurality of bi-directional switching circuits for synchronously transferring the photoelectrons accumulated in said collection wells to said storage wells and enabling said anti-blooming circuit at the onset of one portion of said frame time to divert photoelectrons from accumulating in said collection wells and for transferring the stored photoelectrons back into said collection wells and disabling said anti-blooming circuit for further accumulation of photoelectrons in said collection wells at the onset of another portion of said frame time.

2. The system of claim 1 in which said anti-blooming circuit includes an anti-blooming gate interconnected with each said collection well.

3. A synchronously gated high speed CCD imager system, comprising;
    a plurality of synchronously gated CCD imager arrays each array including:
    a plurality of photoelectric collection quantum wells for collecting photoelectrons from an object;
    a plurality of storage wells associated with said collection wells;
    an anti-blooming circuit for diverting photoelectrons from accumulating in said collection wells; and
    switching means including a plurality of bi-directional switching circuits for successively disabling the anti-blooming circuit of each synchronously gated CCD imager array for transferring, at the onset of a predetermined time period, the photoelectrons accumulated in said collection wells to said storage wells of the synchronously gated CCD imager array whose anti-blooming circuit was last disabled and for simultaneously enabling the anti-blooming circuit of said other synchronously gated CCD imager arrays for transferring the accumulated photoelectrons back into said collection wells of the synchronously gated CCD imager array whose anti-blooming circuit is presently disabled for further accumulation of photoelectrons in said collection wells during said predetermined time period.

4. The system of claim 3 in which each said anti-blooming circuit includes an anti-blooming gate interconnected with each said quantum well.

* * * * *